(12) United States Patent
Treaster et al.

(10) Patent No.: US 6,482,054 B2
(45) Date of Patent: Nov. 19, 2002

(54) TUNNEL THRUSTER AND WATER LUBRICATED ROTOR DUCT ASSEMBLY

(75) Inventors: Allen L. Treaster, Julian; Michael J. Beam, Tyrone, both of PA (US); Carl G. Schott, Simpsonville, SC (US); Timothy A. Brungart, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/871,185

(22) Filed: May 31, 2001

(65) Prior Publication Data

US 2001/0049239 A1 Dec. 6, 2001

Related U.S. Application Data

(60) Provisional application No. 60/208,528, filed on Jun. 1, 2000.

(51) Int. Cl.⁷ ............................................... B63H 11/00
(52) U.S. Cl. .............................. 440/38; 440/6; 114/151
(58) Field of Search ................................. 114/151, 312; 440/6

(56) References Cited

U.S. PATENT DOCUMENTS

| 2,963,543 A | | 12/1960 | Link et al. |
| 3,127,865 A | * | 4/1964 | Pleuger ....................... 114/151 |
| 3,356,849 A | | 12/1967 | Lehmann |
| 5,252,875 A | | 10/1993 | Veronesi et al. |
| 5,289,068 A | | 2/1994 | Veronesi et al. |
| 5,758,592 A | | 6/1998 | Benson, Jr. |
| 6,009,822 A | | 1/2000 | Aron |
| 6,325,683 B1 | * | 12/2001 | Yocom ........................... 440/6 |

* cited by examiner

Primary Examiner—Ed Swinehart
(74) Attorney, Agent, or Firm—John J. Elnitski, Jr.

(57) ABSTRACT

A tunnel thruster which is compact, quiet and can withstand the higher depth pressure encountered by a UUV. The UUV is usually a cylindrically shaped vessel and has a propulsor with control surfaces at one end. At two positions along the length of the body there are two cylindrical ports which pass through the body of the UUV. At each position one port is in the vertical plane while the other port is in the horizontal plane. These ports are four tunnel thrusters, which enable the maneuvering of the UUV. The tunnel thruster can be mounted in the ports of the UUV. The main components of the tunnel thruster includes a tunnel, motor assembly mounted in the tunnel, rotors on each end of the motor assembly and inlet ducts on each end of the tunnel. The tunnel thruster attempts to address the short comings of the commercial thrusters. The tunnel thruster is an all electrically powered thruster with all mechanical components contained within the tunnel. The rotors operate independently and are counter-rotating. Each rotor is directly driven by its own electric motor. The rotors are held in position by water lubricated fluid film journal and thrust bearings. The rotor duct assembly includes the rotor, inlet duct, bearing and seals, which can be used in other applications.

41 Claims, 12 Drawing Sheets

TUNNEL THRUSTER AND WATER LUBRICATED ROTOR DUCT ASSEMBLY

This application claims priority to U.S. Provisional Application No. 60/208,528 filed Jun. 1, 2000 and hereby incorporates it by reference.

BACKGROUND

In the past decade there has been a growing need for Unmanned Underwater Vehicles (UUVs). This type of vehicle is typically used for scientific, photographic, and reconnaissance work. The UUV is typically a cylindrical shaped vessel with a rotor driven propulsor mounted at one end. The propulsor propels the vehicle to and from its work site. Airfoil-shaped control surfaces are used to direct the movement of the vehicle by deflection of the relative water flow across the contours of the control surfaces. These control surfaces are effective as long as the vehicle's velocity is approximately two nautical miles per hour and faster. However, a UUV is often required to maneuver at speeds less than two nautical miles per hour. The vehicle may also be required to hover in position while being exposed to cross currents. Therefore, there are times the UUV's control surfaces are ineffective and an alternate method of control must be sought.

One alternate is a tunnel thruster, which is a tunnel that houses a rotor or set of rotors. The rotor or rotors blow jets of water through the tunnel in the direction opposite to which the UUV is desired to be maneuvered. Most commercially available tunnel thrusters are used on yachts and other water craft. The tunnel thruster is mounted in a ship hull and used for short durations of time. The tunnel thruster is used for the purpose of maneuvering the water craft into position for docking. Thrust from the tunnel thruster is generated by one or two rotors mounted on a single shaft inside of the tunnel. Typically, power is provided by a hydraulic motor mounted outside the tunnel with torque being transmitted to the drive shaft by a set of bevel gears. The gears are housed in a strut which also supports the rotor shaft assembly. In some situations, a single rotor may be driven by a hydraulic motor which is mounted inside the tunnel on the same axis as the rotor. Hydraulic power to this motor is provided by hydraulic lines which are housed by a strut which supports the rotor/motor assembly. The strut is attached to the tunnel wall. These tunnel thrusters are sufficient for the applications which they are intended.

However, UUV operation usually requires a propulsion unit to be quiet, to be capable of sustained operation a high pressure due to the operating depth of a UUV. The following is true for most commercially available tunnel thrusters. The use of ball bearings and gears generates a great deal of mechanical noise, which is radiated by the structure surrounding it. The struts which support the drive shaft rotor assemblies or house the gears and hydraulic components create large wakes in the flow of water through the tunnels. These wakes are a noise source as the rotor blades tend to chop through them. The size of the struts also creates a large blockage in the flow area of the tunnel which lowers the efficiency of the assembly. The use of a single rotor or the use of two rotors turning in the same direction (both mounted at opposite ends of the same shaft) causes the flow of water leaving the tunnel to leave in a swirling motion. The seals used to seal the drive shafts and other components are not sufficient for the depth pressures required. In addition, the blade contours, surfaces finishes, and overall quality of the components would result in hydrodynamic noise and inefficiencies. In addition, because these systems employ the use of hydraulic motors, these assemblies also require the use of a pump, valves, reservoirs, and other hardware mounted outside of the tunnel. Current size of available tunnel thrusters do not provide for a very compact system for a vehicle which has limited space available. For these reasons listed above, commercially available tunnel thrusters are not a viable alternative for use in a UUV.

It is an object of the present invention to provide a tunnel thruster which is highly efficient, compact, and quiet.

It is another object of the present invention to provide a tunnel thruster which can operate at a depth pressure of at least 600 psi.

SUMMARY OF THE INVENTION

A tunnel thruster for a water craft which includes the following. A tunnel which fits into the water craft. A water tight motor housing having two ends, whereby the motor housing mounted in the tunnel. At least one strut attached between the tunnel and the motor housing to mount and secured the motor housing in the tunnel, where the at least one strut including a pathway for electric and instrumentation lines. Two electric motors each including a drive shaft extending from an end of the motor, the motors mounted in an inline position along a centerline of the tunnel inside the motor housing, such that the drive shafts of the motors extend from each end of the motor housing along the centerline. A water lubricated rotor duct assembly mounted on each end of the motor housing. The rotor duct assembly includes the following. A rotor attached to the drive shaft and about the motor housing, where the rotor having a main body which includes a front and a rear, and the front having a face. At least two blades extending from the main body of the rotor between the front and the rear of the main body of the rotor. A stabilizer shaft extending away from the motor housing, the stabilizer shaft extending from a center of the face of the front of the main body of the rotor, where the stabilizer shaft having a nose at an end of the stabilizer shaft which is forward of the face. A cavity milled in the rear of the main body of the rotor to receive the drive shaft, at least part of the motor drive housing, bearings and seals, such that the main body of the rotor is mounted over the motor housing and internally connected to the nose of the drive shaft. A rear seal assembly applying a seal against the drive shaft and against the cavity of the main body of the rotor. A rear journal bearing providing a bearing surface between the cavity of the main body of the rotor and the motor drive housing, where the rear journal positioned near the rear of the main body of the rotor, the rear journal bearing lubricated by water surrounding the rotor duct assembly. An inlet duct for attachment to the water craft to support the rotor duct assembly, where the inlet duct including an outer rim and a center hub centered in the outer rim, the outer rim for attachment to the water craft and for supporting the center hub, where the center hub for supporting the stabilizer shaft of the rotor, and where the center hub having a front and a rear, the rear of the center hub including a cavity milled to receive bearings. A forward bearing assembly in the cavity of the center hub, where the forward bearing assembly lubricated by water surrounding the rotor duct assembly. A thrust shoulder attached to the nose of the stabilizer shaft at the front of the center hub, the thrust shoulder having a front and a rear, where the rear of the thrust shoulder milled to receive the nose of the stabilizer shaft, where the thrust shoulder having a nose at the front of the thrust shoulder, and where the thrust shoulder aiding in retaining the forward bearing assembly in place. A forward seal assembly to receive the nose of the thrust shoulder. A duct cover which attaches to the front of the center hub and over the thrust shoulder, where the duct cover having a front and a rear, and where the rear of the duct cover including a cavity milled to receive the forward seal assembly and the thrust shoulder.

DETAILED DESCRIPTION OF THE INVENTION

Figure 1:
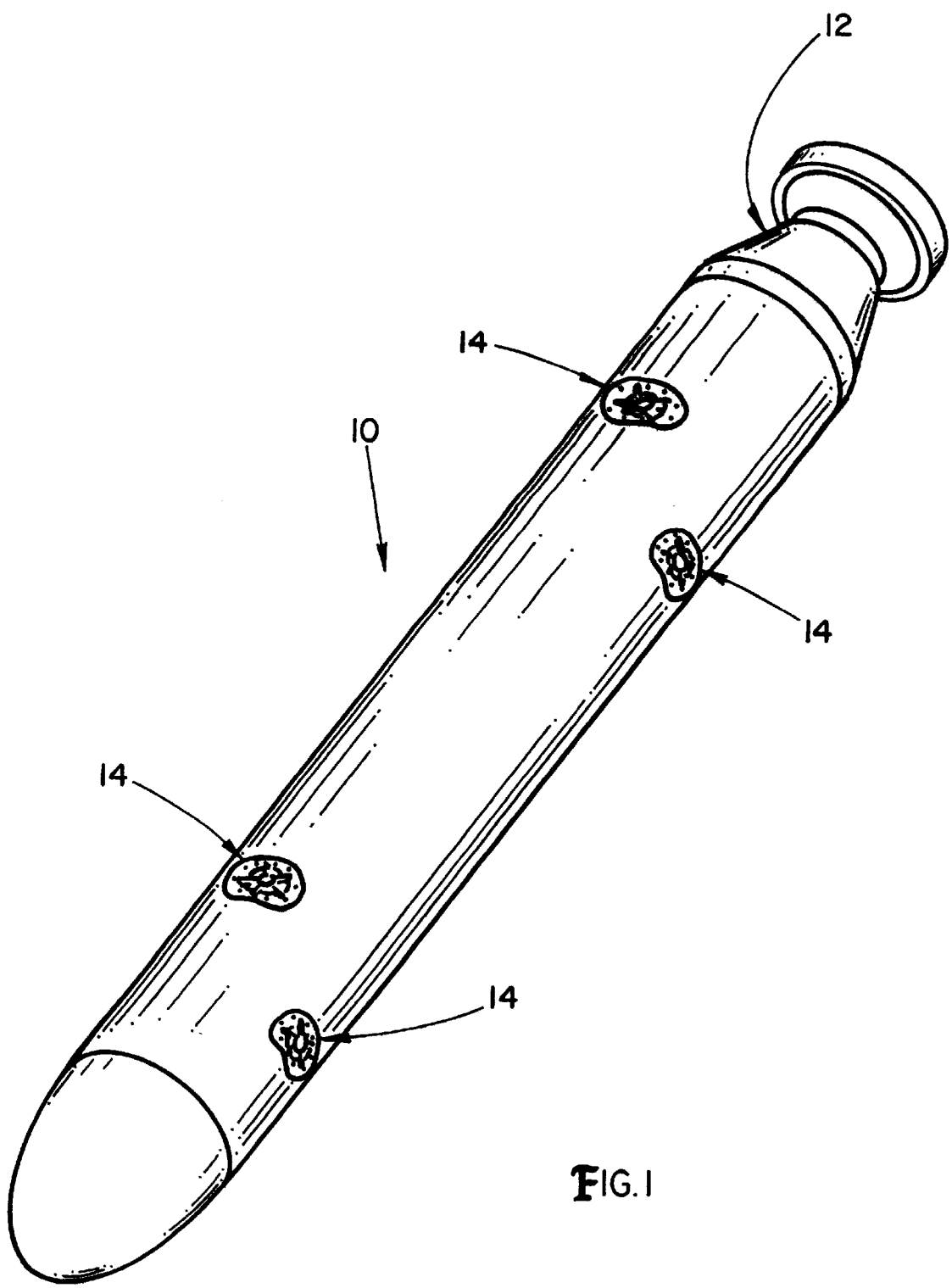
FIG. 1 is a perspective view of a UUV including tunnel thrusters according to the present invention.
Figure 2:
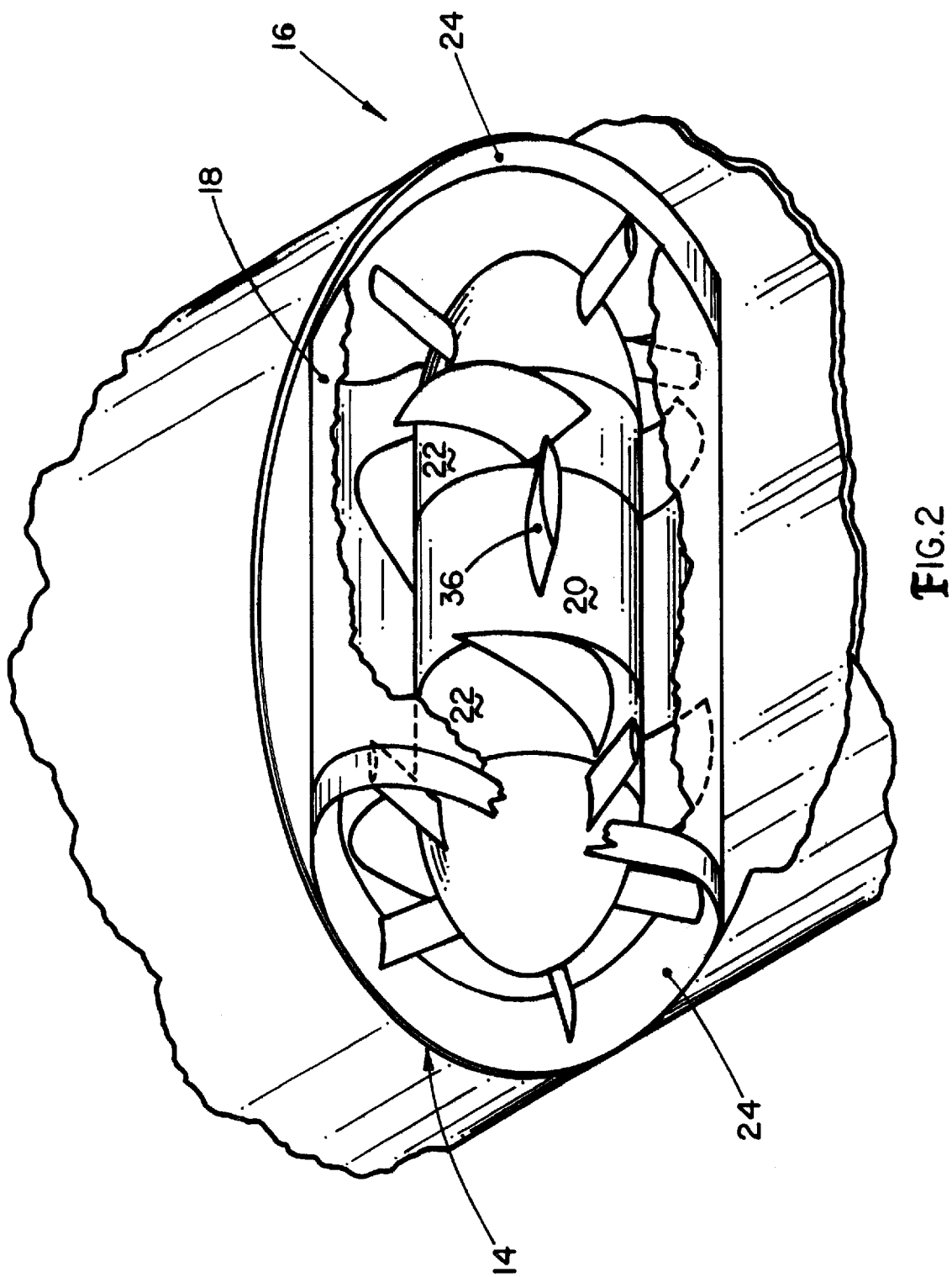
FIG. 2 is a cut-away view of the tunnel thruster in the UUV according to the present invention.
Figure 3:
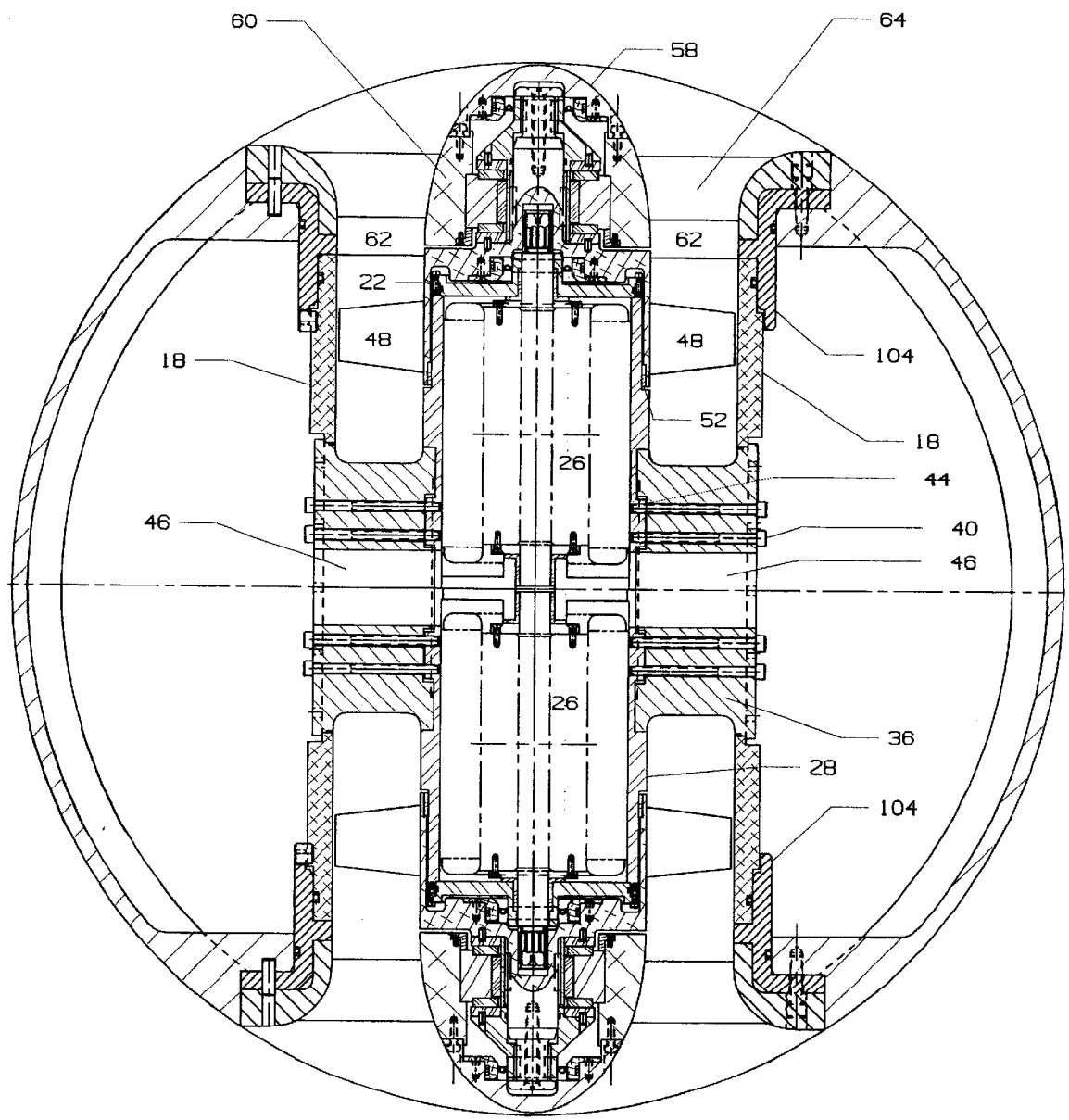
FIG. 3 is a cross-sectional view of the tunnel thruster in the UUV according to the present invention.
Figure 4:
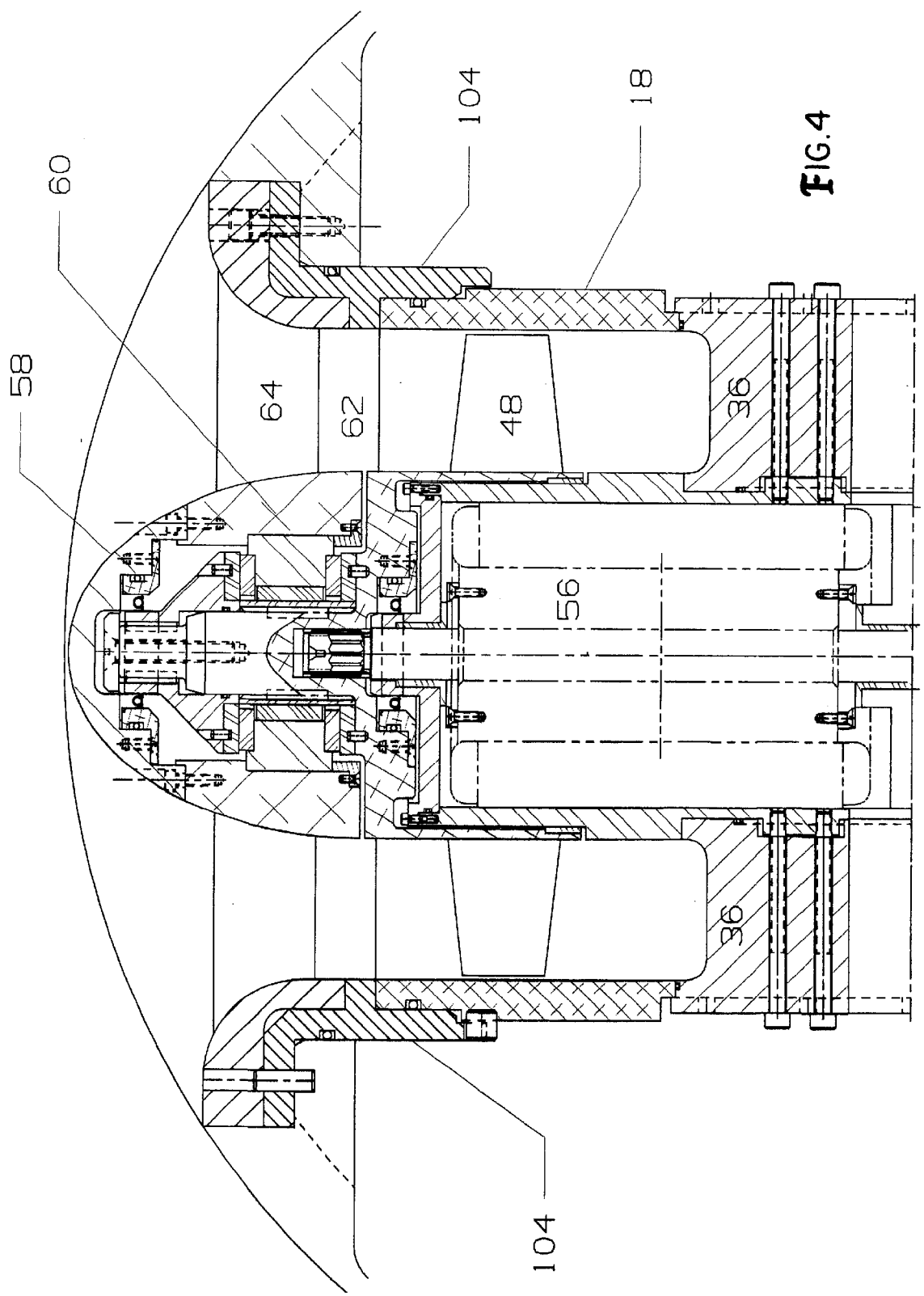
FIG. 4 is a cross-sectional view of the tunnel thruster in the UUV according to the present invention.
Figure 5:
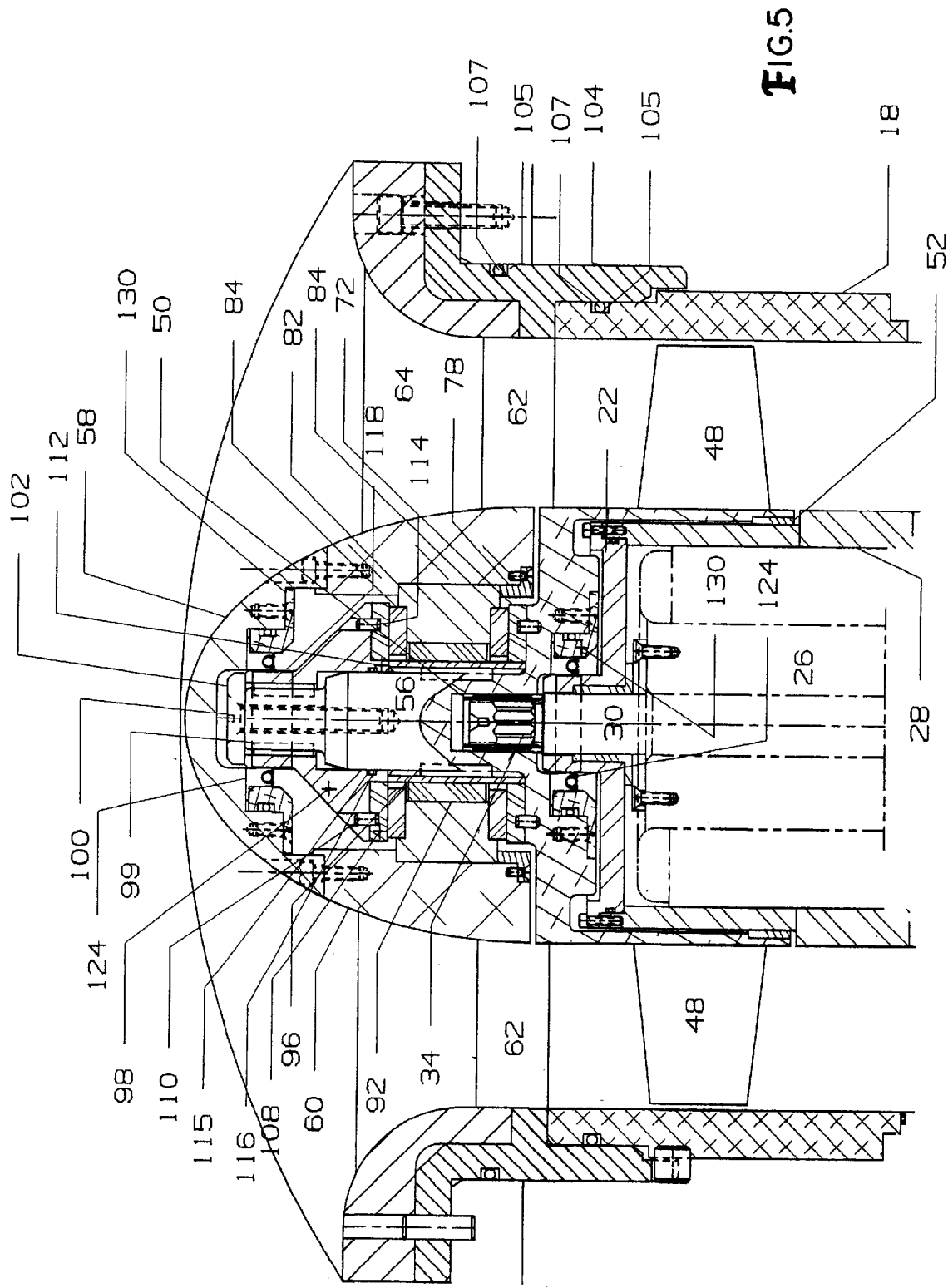
FIG. 5 is a cross-sectional view of the tunnel thruster in the UUV according to the present invention.
Figure 6:
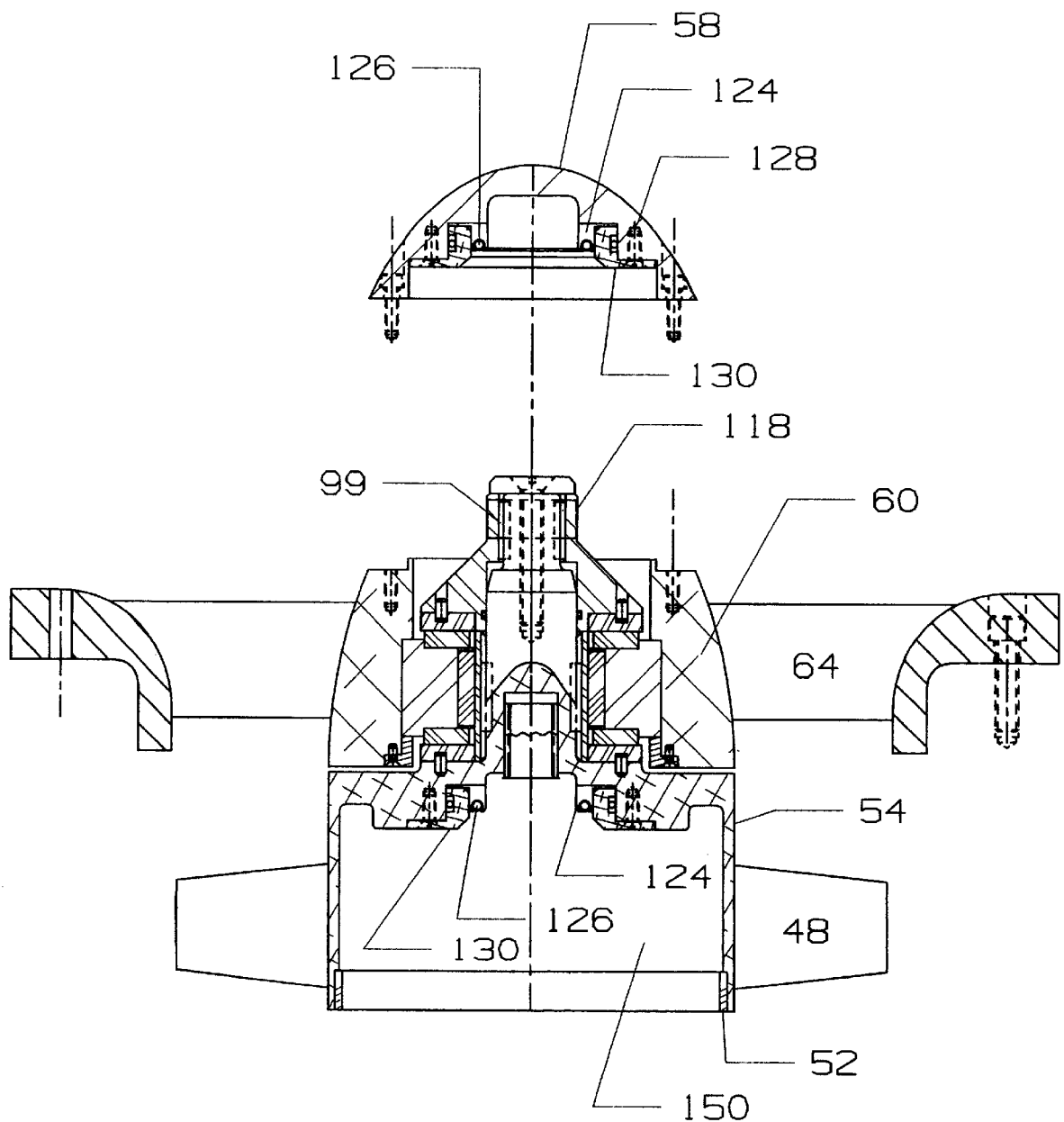
FIG. 6 is a cross-sectional view of the tunnel thruster in the UUV according to the present invention.

The present invention is a tunnel thruster which is compact, quiet and can withstand the higher depth pressure encountered by a UUV. FIG. 1 is a representation of a UUV 10. The UUV 10 is usually a cylindrically shaped vessel and has a propulsor 12 with control surfaces at one end. At two positions along the length of the body there are two cylindrical ports 14 which pass through the body of the UUV 10. At each position one port 14 is in the vertical plane while the other port 14 is in the horizontal plane. These ports 14 are four tunnel thrusters, which enable the maneuvering of the UUV 10. FIG. 2 is a representation of the tunnel thruster 16 according to the present invention, which can be mounted in the ports 14 of the UUV 10. FIG. 2 shows the main components of the tunnel thruster 16, which includes a tunnel 18, motor assembly 20 mounted in the tunnel 18, rotors 22 on each end of the motor assembly 20 and inlet ducts 24 on each end of the tunnel 18. The tunnel thruster 16 attempts to address the short comings of the commercial thrusters. The tunnel thruster 18 is an all electrically powered thruster with all mechanical components contained within the tunnel 18. The rotors 22 operate independently and are counter-rotating. Each rotor 22 is directly driven by its own electric motor 26. The rotors 22 are held in position by water lubricated fluid film journal and thrust bearings. The rotor duct assembly includes the rotor 22, inlet duct 24, bearing and seals, which can be used in other applications.

FIGS. 3–6 show a cross-sectional views of the tunnel thruster 16, which show motors 26, bearing assemblies, seal assemblies and mounting of the main components in a port 14 of a UUV 10. FIGS. 3–6 also show all fasteners used to secured all the parts of the tunnel thruster 16 together. FIGS. 7–12 show exploded views of the internal parts of the tunnel thruster 16. FIGS. 3–6 should be reviewed in relation to FIGS. 7–12, while reading the following disclosure. All of the parts of the tunnel thruster 16 are usually aluminum, unless mentioned otherwise. The fasteners employed including screws, bolts and pins are usually stainless steel.

Figure 7:
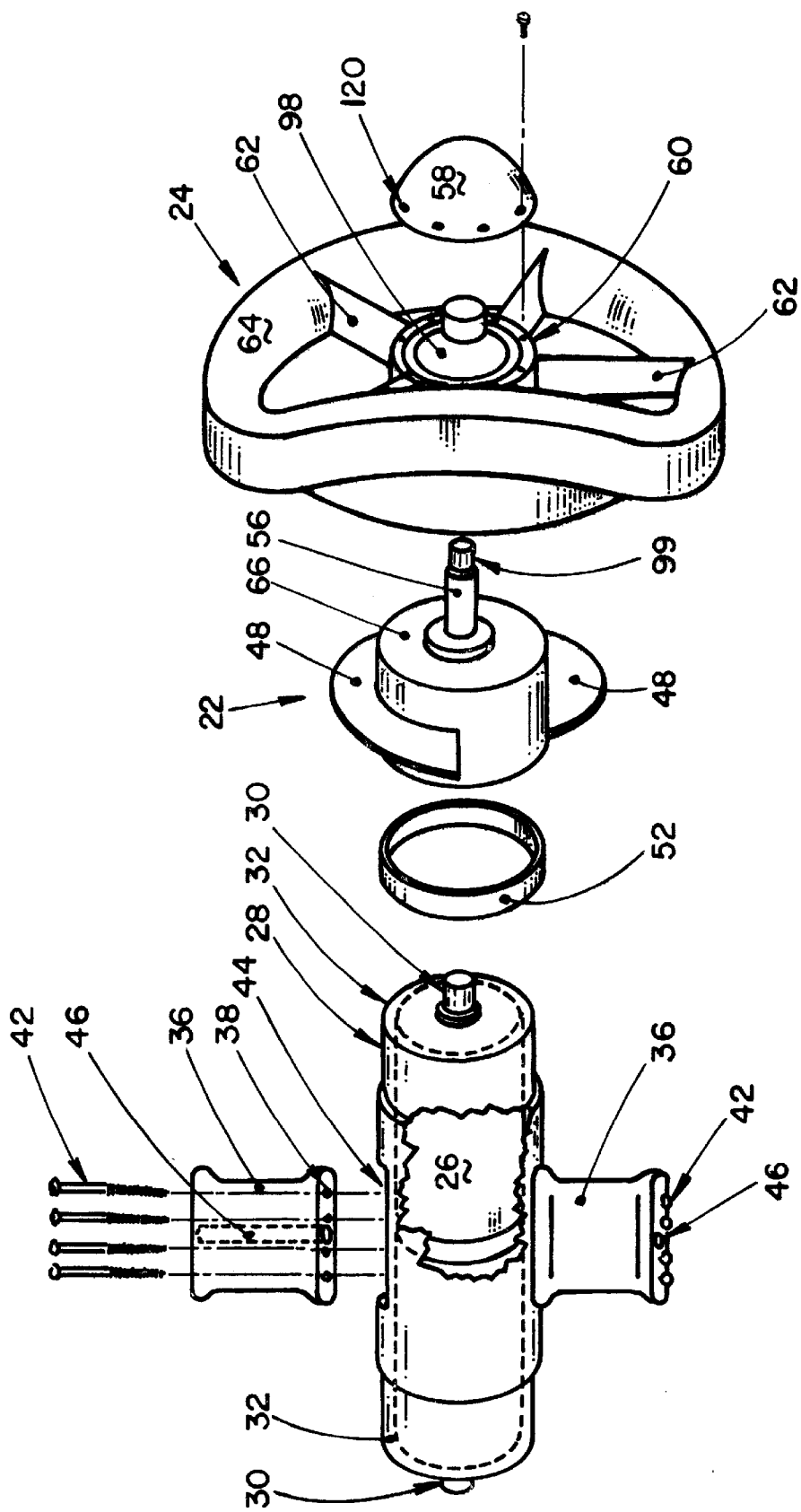
FIG. 7 is an exploded view of a motor assembly and rotor duct assembly according to the present invention.

FIG. 7 shows the motor assembly 20, one of the rotors 22 and one of the inlet ducts 24. Each rotor 22 and inlet duct 24, along with associated bearing and seal assemblies, makes up the rotor duct assembly. The rotor duct assembly is the same on either end of the motor assembly 20. The motor assembly 20 includes a cylindrical shaped water tight motor housing 28, in which the two electric motors 26 are mounted. The motors 26 are mounted in an inline position along the centerline of the tunnel 18, such that a drive shaft 30 extends from each motor 26 at the ends 32 of the motor housing 28. Each drive shaft 30 includes a splined end 34. The motor housing 28 is mounted within the tunnel 18 by two thin aerodynamically shaped aluminum struts 36 on the centerline of the tunnel 18. Each strut 36 includes bolt holes 38 to receive bolts 40 that extend from the wall of the tunnel 18. The bolts 40 engage threaded holes 44 in the motor housing 28. Each strut 36 also includes an opening 46 machined through the center of the strut 36 for electrical power and instrumentation wires to pass through to the motors 26 from outside the tunnel 18. Each rotor 22 includes three skewed blades 48 to reduce noise due to wake interaction. Each rotor 22 mounts onto one of the drives shafts 30 at the ends 32 of the motor housing 28 and includes an internal female spline 50 to engage the splined end 34 of the drive shaft 30 of the motor 26. FIG. 7 shows a rear journal bearing 52 used to prevent direct contact of a main body 54 of the rotor 22 with the motor housing 28. The rear journal bearing 52 fits inside the rear of the rotor 22 and is ring shaped. The rear journal bearing 52 is lubricated by the water surrounding the rotor 22. Each rotor 22 includes a stabilizer shaft 56 extending forward of the blades 48 to provide lateral stability along the centerline of the tunnel 18. FIG. 7 also shows the inlet duct 24 which mounts to the tunnel 18 and a duct cover 58 which mounts to the inlet duct 24. The duct cover 58 provides a smooth surface for the water to past as the water enters or leaves the tunnel 18. The inlet duct 24 includes a center hub 60, five stator vanes 62, and an outer rim 64. The stator vanes 62 are elliptically shaped and designed to absorb the thrust generated by each rotating motor 26. In addition to supporting the center hub 60, which aids in supporting the rotor 22, the stator vanes 62 will have a tendency to remove any residual water swirl created by the counter-rotating rotors 22. The number of stator vanes 62 was chosen based on the number of rotor blades 48, as five is a prime number and not a multiple of three. The outer rim 64 of the inlet duct 24 positions and supports the tunnel 18, struts 36, and motor assembly 20 in the vehicle shell. The inlet ducts 24 are removable and replaceable with other sized ducts, so that the same tunnel 18, strut 36 and motor housing 28 may be used with vehicles of other shapes or sizes.

Figure 8:
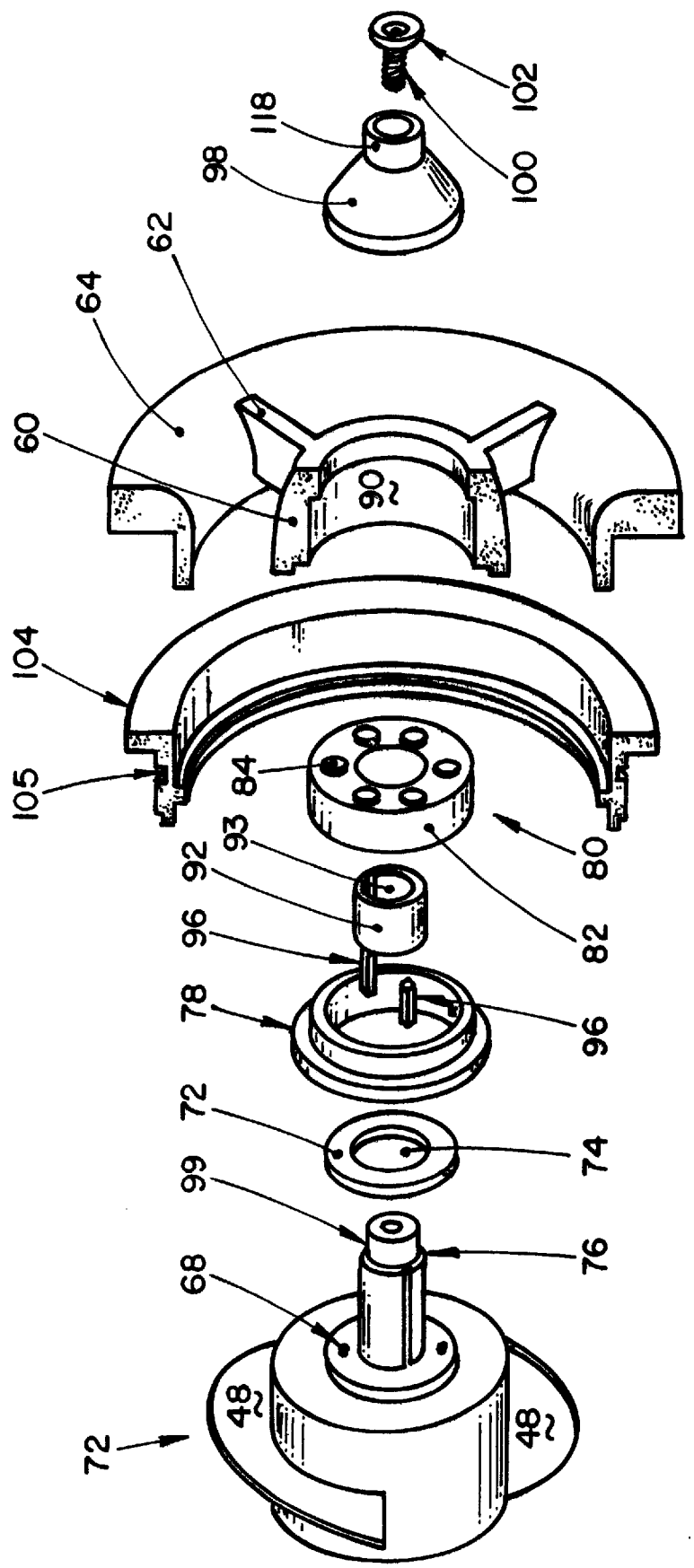
FIG. 8 is an exploded view of the rotor duct assembly according to the present invention.
Figure 9:
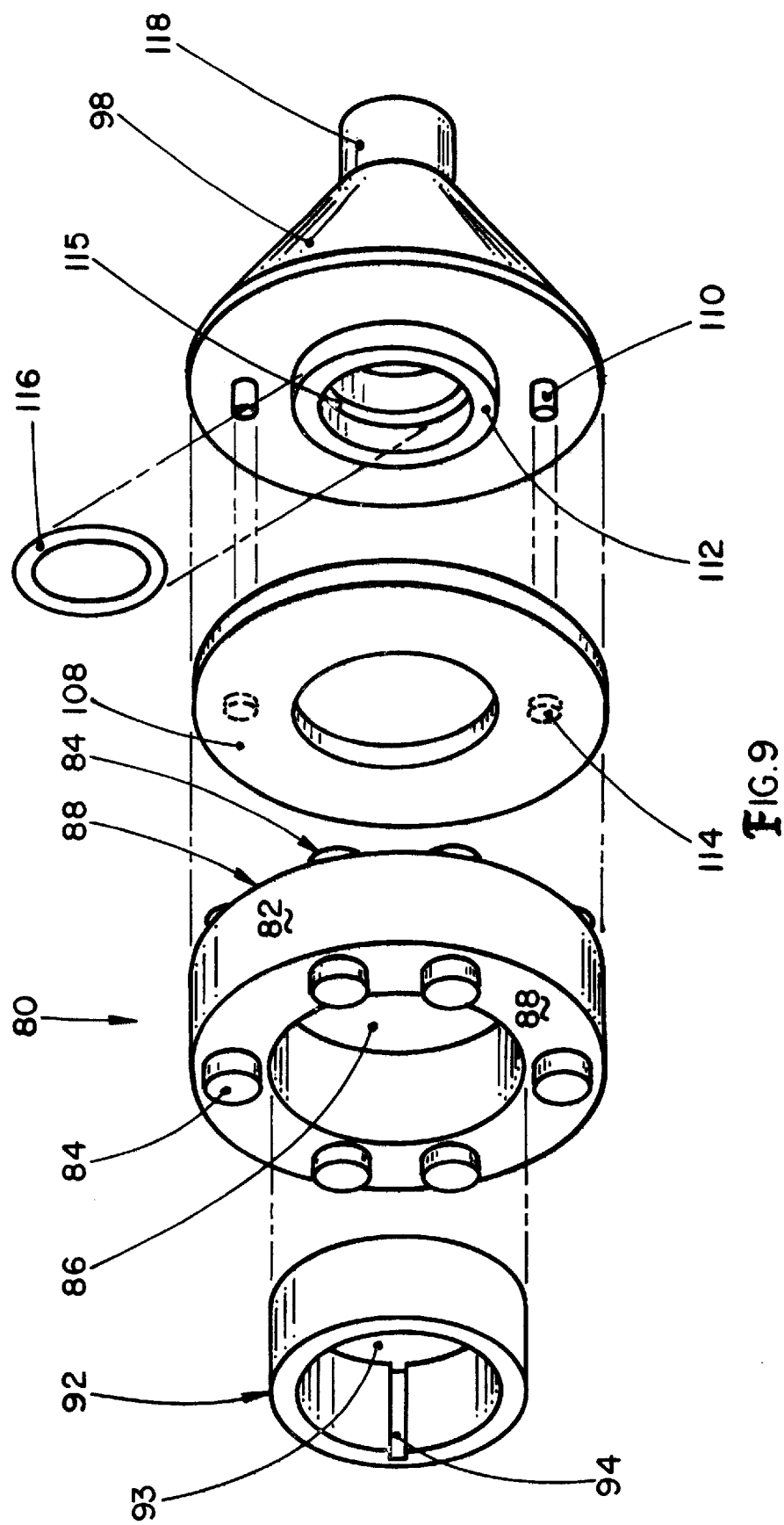
FIG. 9 is an exploded view of a forward bearing assembly according to the present invention.
Figure 10:
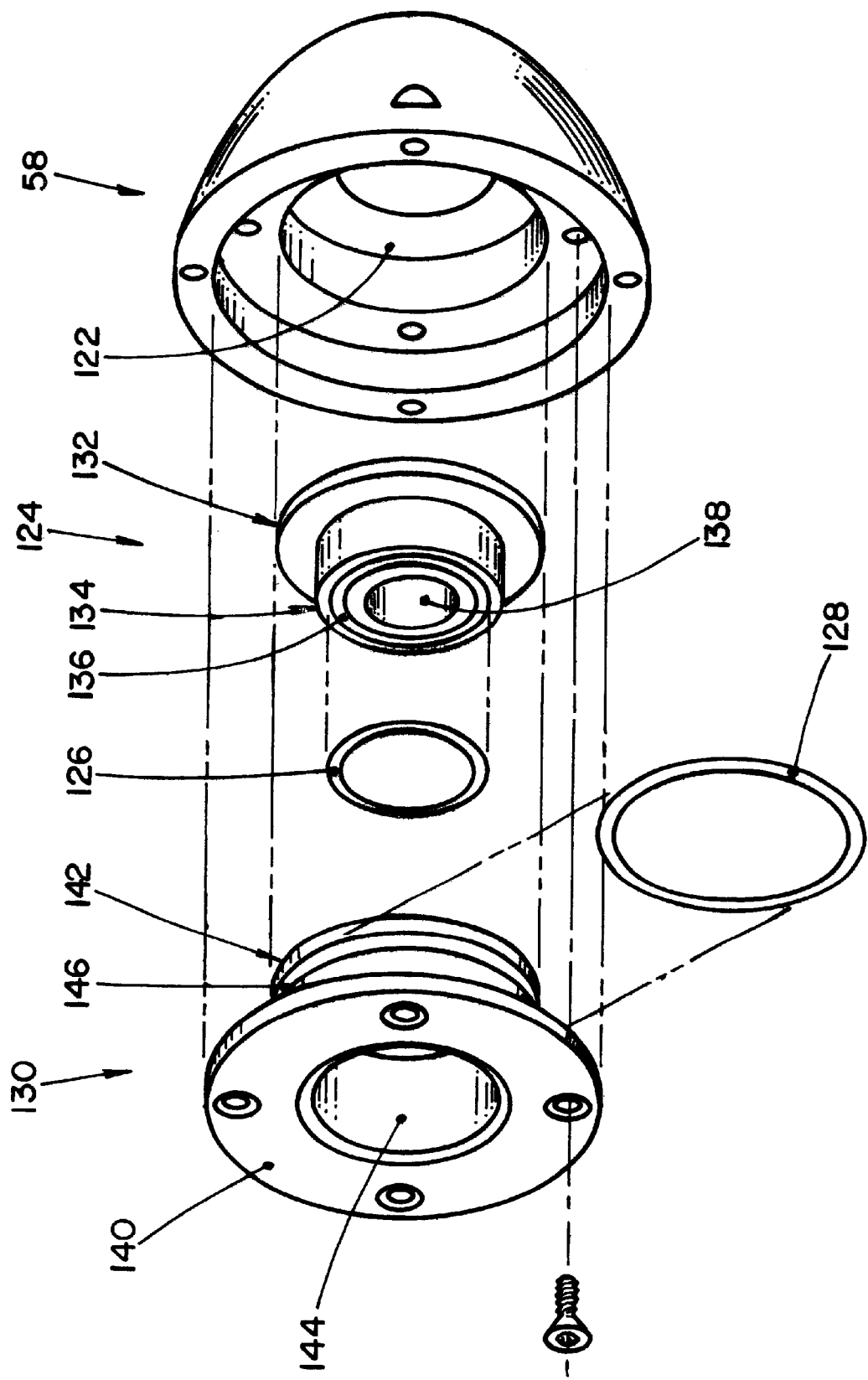
FIG. 10 is an exploded view of a forward seal assembly and a duct cover according to the present invention.

FIGS. 8–10 show the rotor 22 and a forward bearing assembly. The forward bearing assembly provides bearing surfaces between the rotor 22, stabilizer shaft 56 and the center hub 60. FIG. 8 shows the rotor 22 and the stabilizer shaft 56. On a forward face 66 of the rotor 22 are two rotor pins 68. The rotor pins 68 engage pin cavities 70 in a rear stainless steel thrust runner 72. The rear thrust runner 72 is disc shaped and includes a center opening 74 to pass over the stabilizer shaft 56. The rear thrust runner 72 acts as a wear surface and turns with the rotor 22. The stabilizer shaft 56 includes two slots 76 to act as key ways. A forward bearing retainer 78 is secured to the rear of the center hub 60 of the inlet duct 24 with fasteners. The forward bearing retainer 78 aids in retaining the forward bearing assembly in place. A main part of the forward bearing assembly is a tilting pad thrust bearing 80. The tilting pad thrust bearing 80 is made up of a stainless steel thrust bearing 82 with tilting pads 84 mounted on both sides of the thrust bearing 82. The thrust bearing 82 is a ring having center opening 86 and two sides 88 defined by an outside circumference of the ring and the center opening 86. The tilting pads 84 are movable and each pad 84 includes a polymer cap that acts as a bearing surface. The tilting pad thrust bearing 80 mounts between the stabilizer shaft 56 and a milled out cavity 90 inside the rear of the center hub 60 of the inlet duct 24. Mounted inside the center opening 86 of the thrust bearing 82 is a stainless steel journal runner 92, which acts as a wear surface. The journal runner 92 is a ring shaped bearing surface which includes a center opening 93. The journal runner 92 includes two key ways 94 on an inside diameter, which receive two keys 96. The two keys 96 also fit the key way slots 76 of the stabilizer shaft 56, therefore locking the journal runner 92 to the stabilizer shaft 56. Forward of the center hub 60 of the inlet duct 24 is a thrust shoulder 98 which mounts to a nose 99 of the stabilizer shaft 56. The thrust shoulder 98 is mounted using a fastener 100 and a stainless steel washer 102. The thrust shoulder 98 aids in holding the front bearing assembly in the center hub 60 of the inlet duct 24. FIG. 8 also shows a duct liner 104 which acts an interface between the inlet duct 24 and the tunnel 18. The duct liner 104 acts as a seal between the inlet duct 24 and the tunnel 24 to prevent infiltration of water into the UUV 10, as the inlet duct 24 is a casting that is porous. FIGS. 3–6 and 8 shows grooves 105 in the duct liner 104 and tunnel 18, which accept o-rings 107. FIG. 9 shows a rear perspective view of the interaction of the tilting pad thrust bearing 80 and the rear of the thrust shoulder 98. Shown in FIG. 9 is the stainless steel journal runner 92, the tilting pad thrust bearing 80, a stainless steel forward thrust runner 108 and the thrust shoulder 98. The thrust shoulder 98 includes two pins 110 and ring shaped shoulder 112 on the rear of the thrust shoulder 98. The forward thrust runner 108 fits over the ring shaped shoulder 112 and includes two pin cavities 114 to receive the pins 110. The forward thrust runner 108 is the same as the rear thrust runner 72 and also acts as a wear surface. The thrust shoulder 98 includes a groove 115 in the inside diameter of the thrust shoulder 98 to receive an o-ring 116. The o-ring 116 prevents water from entering the forward end of the thrust shoulder 98.

FIG. 10 shows a rear view of the duct cover 58 and internal forward seal assembly of the duct cover 58. The forward seal assembly of the duct cover 58 interacts with a nose 118 of the thrust shoulder 98, when the duct cover 58 is mounted to the center hub 60 of the inlet duct 24. The duct cover 58 includes fastener holes 120 and is mounted using fasteners to the center hub 60 of the inlet duct 24. The fastener holes 120 are covered with a wax material to provide a smooth surface on the outside of the duct cover 58. The duct cover 58 includes a milled out cavity 122 in the rear of the duct cover 58 to receive the nose 118 of the thrust shoulder 98 and a forward seal assembly. The forward seal assembly of the duct cover 58 includes a flange lip seal 124, garter spring 126, o-ring 128 and forward seal retainer 130. The flange lip seal 124 fits into an area of the rear cavity 122 of the duct cover 58. The flange lip seal 124 is usually made of a hard polymer material. The flange lip seal 124 includes a flange 132 and a main body 134. The main body 134 includes a groove 136 in one end, the flange 132 on the other end and an center opening 138. The groove 136 is for receiving the garter spring 126. The nose 118 of the thrust shoulder 98 fits into the center opening 138 of the flange lip seal 124. The forward seal retainer 130 includes a flange 140, main body 142 and a center opening 144 in the main body 142. The center opening 144 of the forward seal retainer 130 is large enough to fit over the main body 134 of the flange lip seal 124 and allows the entrance of the nose 118 of the thrust shoulder 98. The forward seal retainer 130 includes a groove 146 about the main body 142 to receive an o-ring 148. The forward seal retainer 130 is fastened to the rear of the duct cover 58 using fasteners. When assembled, the main body 142 of the forward seal retainer 130 is seated against the flange 132 of the flange lip seal 124 to hold the flange lip seal 124 in place. The garter spring 126 forces the inside diameter of the main body 134 of the flange lip seal 124 against the nose 118 of the thrust shoulder 98 to form a seal. The garter spring 126 forces the outside diameter of the main body 134 of the flange lip seal 124 against center opening 142 of the forward seal retainer 130 to form a seal. The o-ring 128 of the forward seal retainer 130 prevents water from getting behind the flange lip seal 124. The forward seal assembly in the duct cover 58 prevents water and prevents pressure from the water from being applied against the nose 118 of the thrust shoulder 98 and hence the centerline of the rotor 22.

Figure 11:
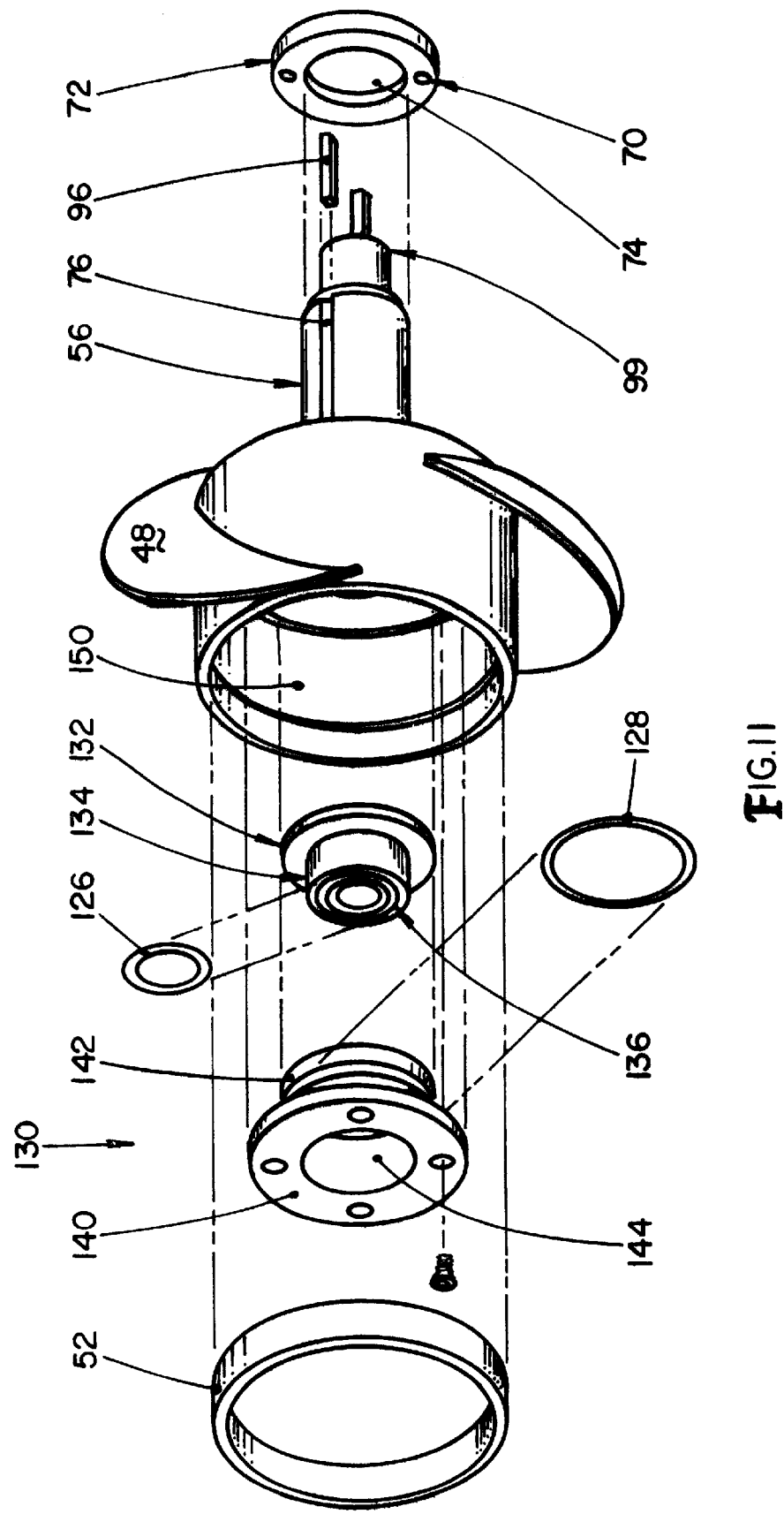
FIG. 11 is an exploded view of a rear seal assembly and a rotor according to the present invention.
Figure 12:
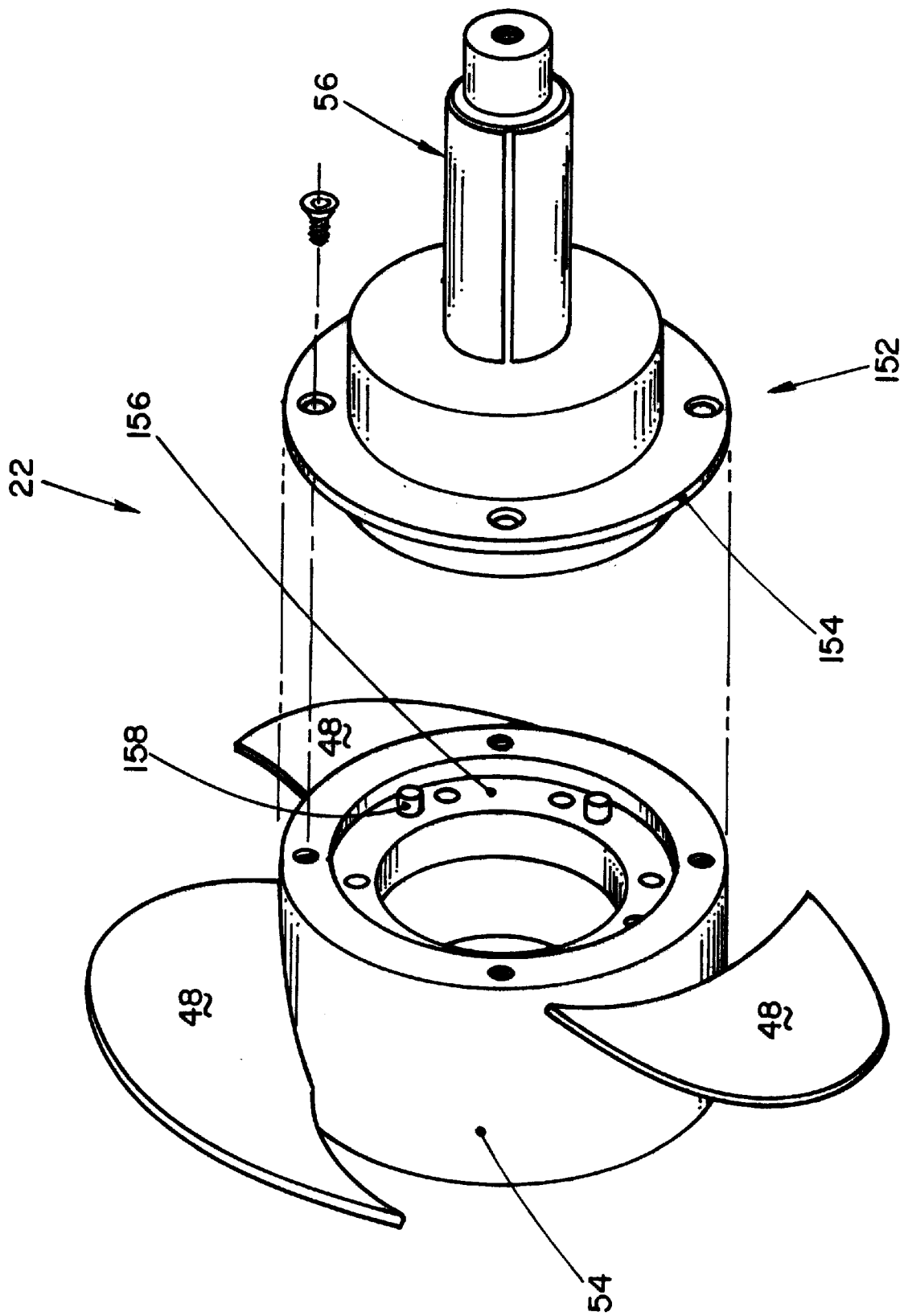
FIG. 12 is an exploded view of a rotor assembly according to the present invention.

FIG. 11 shows a rear view of the rotor 22 and a rear seal assembly in a cavity 150 in the rear of the main body 54 of the rotor 22. The rear seal assembly used in the rotor 22 is the same as the forward seal assembly used in the duct cover 58. The rear seal assembly in the rotor 22 includes a flange lip seal 124, garter spring 126, o-ring 128 and rear seal retainer 130. The rear seal assembly in the rotor 22 is assembled into the inside rear of the rotor 22 in a similar fashion as the duct cover 58. A cavity 150 inside the main body 54 of the rotor 22 is milled to receive the rear seal assembly. Also shown are the journal bearing 52, the rear thrust runner 72, key way slots 76 on the stabilizer shaft 56 and the keys 96. FIG. 12 shows the rotor 22 made up into a two piece assembly to ease manufacture of the rotor 22. Shown in FIG. 12 is a main body 54 of the rotor 22 and a stabilizer shaft unit 152. The stabilizer shaft unit 152 includes a flange 154 with the stabilizer shaft 56 extending outward from the flange 154. The main body 54 of the rotor 22 includes a recessed cavity 156 to receive the flange 154 of the stabilizer shaft unit 152. The stabilizer shaft unit 152 is fastened to the main body 54 of the rotor 22 using fasteners. The main body 54 of the rotor 22 also includes pins 158 which engage pin cavities (not shown) in the rear of the stabilizer shaft unit 152.

The tunnel thruster 16 has distinct operational advantages desired over the commercially available thrusters. The use of the electric motors 26 eliminates the need for a bulky hydraulic system. The mounting of the electric motors 26 on the same axis as the rotors 22 eliminates the need for a right angle gear drive, which has gears and roller bearings as a potential noise sources. The mounting of the bearings in the center hub 60 of the inlet duct 24 enables the use of fluid film bearings, which use sea water as a lubricant. The fluid film bearings are mechanically much quieter than conventional ball or roller bearings. A special feature which makes it possible to use small motor bearings and small water lubricated rotor bearings is the use of identical forward and rear seal assemblies at each rotor duct assembly. The rear seal assembly inside the main body 54 of each rotor 22 isolates each drive shaft 30 from the effects of vehicle depth pressure. The forward seal assembly in the duct cover 58 equalizes the normal surface area at each end of the rotor duct assembly. This equates the axial force created by depth pressure at each end of the rotor duct assembly. Therefore, the tilting pad thrust bearing 80 must support only the thrust generated by the rotor 22. The axial force operated by depth pressure is absorbed by the stator vanes 62 of the inlet duct 24. This feature enabled the minimization in size of all bearings and made possible the use of non-lubricated polymer bearings in the motor. This eliminated the need for rolling element bearings. These mechanical features make the tunnel thruster 16 a more desirable unit than commercially available thrusters.

The blades 48 shown are much more sophisticated and hydrodynamically acceptable for this application than has been used on previous thrusters. Each rotor 22 has been designed so that they may operate in a counter-rotating fashion, i.e., the rotors 22 will always be turning in the opposite rotational directions. This makes the tunnel thruster 16 more efficient because the rotational velocity or swirling induced into the water as it passes the rotor 22 on the inlet side of the tunnel 18 will be removed by the counter-rotating rotor 22 on the exit end. This is also true when the direction of both motors 26 is reversed and the vehicle moves in the opposite direction. This attempt at eliminating this circular swirling results in the water jet to be axial and more effective in maneuvering the vehicle, as well as avoiding efficiency losses associated with discharging a jet with rotational velocity. As mentioned previously, the struts 36 that support the motor housing 28 were designed as thin and as aerodynamic as possible. This was done to minimize the size of the wakes the rotor blades 46 must pass through. The number of blades 48 were chosen to minimize the noise producing interaction between the wakes and the various blade rows. In addition, skew was induced in the design of the blades 48. Skew is the repositioning of individual radial blade sections on an axis other than a straight radial axis from the rotational center point of the rotor 22. The skew may shift the blade sections into or away from the direction of blade rotation. The blade sections may also be moved in either direction along the axis of rotation. This skewing of the blades 48 reduces noise because the blade enters the wake gradually, i.e., section by section rather than all at one time. The blades 48 of one rotor 22 of the tunnel thruster 16 are skewed toward the blades 48 of the other rotor 22. This was done to enhance noise reduction capabilities and also this design compensates for differences in the angles of flow of the water between the two rotors 22. This enables the running speeds to be matched regardless of the direction they are rotating.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

We claim:

1. Tunnel thruster for a water craft comprising:

a tunnel to be fitted into the water craft;

a water tight motor housing having two ends, said motor housing mounted in said tunnel;

at least one strut attached between said tunnel and said motor housing to mount and secured said motor housing in said tunnel, said at least one strut including a pathway for electric and instrumentation lines;

two electric motors each including a drive shaft extending from an end of said motor, said motors mounted in an inline position along a centerline of said tunnel inside said motor housing, such that said drive shafts of said motors extend from each end of said motor housing along said centerline; and a water lubricated rotor duct assembly mounted on each end of said motor housing comprising:

a rotor attached to said drive shaft and about said motor housing, said rotor having a main body which includes a front and a rear, and said front having a face;

at least two blades extending from said main body of said rotor between said front and said rear of said main body of said rotor;

a stabilizer shaft extending away from said motor housing, said stabilizer shaft extending from a center of said face of said front of said main body of said rotor, said stabilizer shaft having a nose at an end of said stabilizer shaft which is forward of said face;

a cavity milled in said rear of said main body of said rotor to receive said drive shaft, at least part of said motor drive housing, bearings and seals, such that said main body of said rotor is mounted over said motor housing and internally connected to the nose of said drive shaft;

a rear seal assembly applying a seal against said drive shaft and against said cavity of said main body of said rotor;

a rear journal bearing providing a bearing surface between said cavity of said main body of said rotor and said motor drive housing, said rear journal positioned near said rear of said main body of said rotor, said rear journal bearing lubricated by water surrounding said rotor duct assembly;

an inlet duct for attachment to the water craft to support said rotor duct assembly, said inlet duct including an outer rim and a center hub centered in said outer rim, said outer rim for attachment to the water craft and for supporting said center hub, said center hub for supporting said stabilizer shaft of said rotor, said center hub having a front and a rear, said rear of said center hub including a cavity milled to receive bearings;

a forward bearing assembly in said cavity of said center hub, said forward bearing assembly lubricated by water surrounding said rotor duct assembly;

a thrust shoulder attached to said nose of said stabilizer shaft at said front of said center hub, said thrust shoulder having a front and a rear, said rear of said thrust shoulder milled to receive said nose of said stabilizer shaft, said thrust shoulder having a nose at said front of said thrust shoulder, said thrust shoulder aiding in retaining said forward bearing assembly in place;

a forward seal assembly to receive said nose of said thrust shoulder; and a duct cover which attaches to said front of said center hub and over said thrust shoulder, said duct cover having a front and a rear, said rear of said duct cover including a cavity milled to receive said forward seal assembly and said thrust shoulder.

2. The tunnel thruster of claim 1, wherein said rear seal assembly sealing of the nose of said drive shaft and said forward seal assembly sealing off said nose of said thrust shoulder to provide an equal initial pressure on a centerline of said rotor duct assembly and said drive shaft which is maintained during use under water.

3. The tunnel thruster of claim 1, wherein there are at least two struts attached between said tunnel and said motor housing.

4. The tunnel thruster of claim 1, wherein said drive shafts rotate such that said rotors are counter-rotating in orientation.

5. The tunnel thruster of claim 1, wherein said rear seal assembly includes a flange lip seal and a rear seal retainer; wherein said flange lip seal includes a cylindrical shaped main body, a center opening in said main body of said flange lip seal, flange about one end of said main body of said flange lip seal, a groove in an end opposite said end with said flange and a spring in said groove; wherein said center opening of said main body of said flange lip seal is for receiving the drive shaft; wherein said rear seal retainer includes a cylindrical shaped main body, a center opening in said main body of said rear seal retainer, flange at about one end of said main body of said rear seal retainer, a groove about said main body of said rear seal retainer and an o-ring in said groove of said rear seal retainer; wherein said center opening of said main body of said seal retainer is for receiving the drive shaft and main body of said flange lip seal; wherein said o-ring provides a seal between said cavity of said rotor and said rear seal retainer for preventing water from getting behind said rear seal assembly; wherein an end opposite said flange of said rear seal retainer is inserted against said flange of said flange lip seal to retain said flange lip seal in place and said flange of said rear seal retainer is fastened inside said cavity of said rotor; and wherein said spring is for applying said rear flange lip seal against the drive shaft and against an inside surface of said main body of said rear seal retainer along said center opening of said rear seal retainer.

6. The tunnel thruster of claim 1, wherein said forward seal assembly is a flange lip seal and a forward seal retainer; wherein said flange lip seal includes a cylindrical shaped main body, a center opening in said main body of said flange lip seal, flange about one end of said main body of said flange lip seal, a groove in an end opposite said end with said flange and a spring in said groove; wherein said center opening of said main body of said flange lip seal is for receiving said nose of said thrust shoulder; wherein said forward seal retainer includes a cylindrical shaped main body, a center opening in said main body of said forward seal retainer, flange at about one end of said main body of said forward seal retainer, a groove about said main body of said forward seal retainer and an o-ring in said groove of said forward seal retainer; wherein said center opening of said main body of said forward seal retainer is for receiving said nose of said thrust shoulder and said main body of said flange lip seal; wherein said o-ring provides a seal between said cavity of said duct cover and said forward seal retainer for preventing water from getting behind said forward seal assembly; wherein an end opposite said flange of said forward seal retainer is inserted against said flange of said flange lip seal to retain said flange lip seal in place and said flange of said forward seal retainer is fastened inside said cavity of said duct cover; and wherein said spring is for applying said forward flange lip seal against said nose of said thrust shoulder and against an inside surface of said main body of said forward seal retainer along said center opening of said forward seal retainer.

7. The tunnel thruster of claim 1, wherein said forward bearing assembly includes a tilting pad thrust bearing, a journal runner and a forward bearing retainer; wherein said tilting pad thrust bearing includes a thrust bearing with tilting pads; wherein said thrust bearing is a ring with a center opening to receive said journal runner and with two sides defined by an outside circumference of said ring and said center opening; wherein said tilting pads are mounted on said two sides of said thrust bearing, such that contact is provided against said face of said main body of said rotor by one side of said tilting pads and contact is provided against said rear of said thrust shoulder by the other side of said tiling pads; wherein said tilting pads are movable and each of said tilting pads includes a polymer cap that acts as a bearing surface; wherein said tilting pad thrust bearing is mounted between said stabilizer shaft and an inside surface of said center hub; wherein said journal runner is a ring having a center opening to receive said stabilizer shaft and acts as a wear surface between said stabilizer shaft and said tilting pad thrust bearing and wherein said forward bearing retainer fastens to said rear of said center hub for retaining said forward bearing assembly in place.

8. The tunnel thruster of claim 7, further including at least one key; wherein said stabilizer shaft includes at least one key way; wherein said journal runner includes at least one key way; and wherein said at least one key is positioned in said stabilizer shaft at least one key way and said journal runner at least one key way, so as to lock said stabilizer shaft and said journal runner together.

9. The tunnel thruster of claim 6, wherein said thrust shoulder includes a groove in said milled rear of said thrust shoulder to receive an o-ring to prevent water from reaching said nose of said stabilizer shaft.

10. The tunnel thruster of claim 1, further including a rear thrust runner mounted to said face of said main body of said rotor between said face and said tilting pads; further including a front thrust runner mounted to said rear of said thrust shoulder between said thrust shoulder and said tilting pads; wherein said rear and front thrust runners are disc shaped and include a center opening; and wherein said rear and front thrust runners act as wear surfaces.

11. The tunnel thruster of claim 1, wherein there are at least two stators between said center hub and said outside rim of said inlet duct for supporting said center hub inside said outside rim.

12. The tunnel thruster of claim 1, wherein each of said at least two blades includes skew; wherein skew is the repositioning of individual radial blade sections on an axis other than a straight radial axis from a rotational center point of said rotor.

13. The tunnel thruster of claim 12, said blades of each of said rotors are skewed toward the blades of the opposite rotor.

14. The tunnel thruster of claim 1, further including a duct liner between the water craft and said inlet duct to prevent water from entering said water craft.

15. The tunnel thruster of claim 1, wherein said rear seal assembly includes a flange lip seal and a rear seal retainer; wherein said flange lip seal includes a cylindrical shaped main body, a center opening in said main body of said flange lip seal, flange about one end of said main body of said flange lip seal, a groove in an end opposite said end with said flange and a spring in said groove; wherein said center opening of said main body of said flange lip seal is for receiving the drive shaft; wherein said rear seal retainer includes a cylindrical shaped main body, a center opening in said main body of said rear seal retainer, flange at about one end of said main body of said rear seal retainer, a groove about said main body of said rear seal retainer and an o-ring in said groove of said rear seal retainer; wherein said center opening of said main body of said seal retainer is for receiving the drive shaft and main body of said flange lip seal; wherein said o-ring provides a seal between said cavity of said rotor and said rear seal retainer for preventing water from getting behind said rear seal assembly; wherein an end opposite said flange of said rear seal retainer is inserted against said flange of said flange lip seal to retain said flange lip seal in place and said flange of said rear seal retainer is fastened inside said cavity of said rotor; wherein said spring is for applying said rear flange lip seal against the drive shaft and against an inside surface of said main body of said rear seal retainer along said center opening of said rear seal retainer; wherein said forward seal assembly is a flange lip seal and a forward seal retainer; wherein said flange lip seal includes a cylindrical shaped main body, a center opening in said main body of said flange lip seal, flange about one end of said main body of said flange lip seal, a groove in an end opposite said end with said flange and a spring in said groove; wherein said center opening of said main body of said flange lip seal is for receiving said nose of said thrust shoulder; wherein said forward seal retainer includes a cylindrical shaped main body, a center opening in said main body of said forward seal retainer, flange at about one end of said main body of said forward seal retainer, a groove about said main body of said forward seal retainer and an o-ring in said groove of said forward seal retainer; wherein said center opening of said main body of said forward seal retainer is for receiving said nose of said thrust shoulder and said main body of said flange lip seal; wherein said o-ring provides a seal between said cavity of said duct cover and said forward seal retainer for preventing water from getting behind said forward seal assembly; wherein an end opposite said flange of said forward seal retainer is inserted against said flange of said flange lip seal to retain said flange lip seal in place and said flange of said forward seal retainer is fastened inside said cavity of said duct cover; wherein said spring is for applying said forward flange lip seal against said nose of said thrust shoulder and against an inside surface of said main body of said forward seal retainer along said center opening of said forward seal retainer; wherein said forward bearing assembly includes a tilting pad thrust bearing, a journal runner and a forward bearing retainer; wherein said tilting pad thrust bearing includes a thrust bearing with tilting pads; wherein said thrust bearing is a ring with a center opening to receive said journal runner and with two sides defined by an outside circumference of said ring and said center opening; wherein said tilting pads are mounted on said two sides of said thrust bearing, such that contact is provided against said face of said main body of said rotor by one side of said tilting pads and contact is provided against said rear of said thrust shoulder by the other side of said tiling pads; wherein said tilting pads are movable and each of said tilting pads includes a polymer cap that acts as a bearing surface; wherein said tilting pad thrust bearing is mounted between said stabilizer shaft and an inside surface of said center hub; wherein said journal runner is a ring having a center opening to receive said stabilizer shaft and acts as a wear surface between said stabilizer shaft and said tilting pad thrust bearing; wherein said forward bearing retainer fastens to said rear of said center hub for retaining said forward bearing assembly in place; and wherein said thrust shoulder includes a groove in said milled rear of said thrust shoulder to receive an o-ring to prevent water from reaching said nose of said stabilizer shaft.

16. The tunnel thruster of claim 15, wherein said rear seal assembly sealing of the nose of said drive shaft and said forward seal assembly sealing off said nose of said thrust shoulder to provide an equal initial pressure on a centerline of said rotor duct assembly and said drive shaft which is maintained during use under water.

17. The tunnel thruster of claim 15, further including a rear thrust runner mounted to said face of said main body of said rotor between said face and said tilting pads; further including a front thrust runner mounted to said rear of said thrust shoulder between said thrust shoulder and said tilting pads; wherein said rear and front thrust runners are disc shaped and include a center opening; and wherein said rear and front thrust runners act as wear surfaces.

18. The tunnel thruster of claim 15, wherein there are at least two stators between said center hub and said outside rim of said inlet duct for supporting said center hub inside said outside rim.

19. The tunnel thruster of claim 15, wherein each of said at least two blades includes skew; wherein skew is the repositioning of individual radial blade sections on an axis other than a straight radial axis from a rotational center point of said rotor.

20. The tunnel thruster of claim 19, said blades of each of said rotors are skewed toward the blades of the opposite rotor.

21. The tunnel thruster of claim 15, further including a duct liner between the water craft and said inlet duct to prevent water from entering said water craft.

22. The tunnel thruster of claim 15, further including at least one key; wherein said stabilizer shaft includes at least one key way; wherein said journal runner includes at least one key way; and wherein said at least one key is positioned in said stabilizer shaft at least one key way and said journal runner at least one key way, so as to lock said stabilizer shaft and said journal runner together.

23. The tunnel thruster of claim 15, wherein there are at least two struts attached between said tunnel and said motor housing.

24. The tunnel thruster of claim 15, wherein said drive shafts rotate such that said rotors are counter-rotating in orientation.

25. A water lubricated rotor duct assembly for attachment to a water craft and a drive unit of the water craft, whereby the drive unit includes a drive housing and a drive shaft with a nose extending from the drive housing, comprising:

a rotor attached to the drive unit, said rotor having a main body which includes a front and a rear, and said front having a face;

at least two blades extending from said main body of said rotor between said front and said rear of said main body of said rotor;

a stabilizer shaft extending away from the drive unit, said stabilizer shaft extending from a center of said face of said front of said main body of said rotor, said stabilizer shaft having a nose at an end of said stabilizer shaft which is forward of said face;

a cavity milled in said rear of said main body of said rotor to receive the drive shaft, at least part of the drive housing, bearings and seals, such that said main body of said rotor is mounted over the drive unit and internally connected to the nose of the drive shaft;

a rear seal assembly applying a seal against the drive shaft and against said cavity of said main body of said rotor;

a rear journal bearing providing a bearing surface between said cavity of said main body of said rotor and the drive housing, said rear journal positioned near said rear of said main body of said rotor, said rear journal bearing lubricated by water surrounding said rotor duct assembly;

an inlet duct for attachment to the water craft to support said rotor duct assembly, said inlet duct including an outer rim and a center hub centered in said outer rim, said outer rim for attachment to the water craft and for supporting said center hub, said center hub for supporting said stabilizer shaft of said rotor, said center hub having a front and a rear, said rear of said center hub including a cavity milled to receive bearings;

a forward bearing assembly in said cavity of said center hub, said forward bearing assembly lubricated by water surrounding said rotor duct assembly;

a thrust shoulder attached to said nose of said stabilizer shaft at said front of said center hub, said thrust shoulder having a front and a rear, said rear of said thrust shoulder milled to receive said nose of said stabilizer shaft, said thrust shoulder having a nose at said front of said thrust shoulder, said thrust shoulder aiding in retaining said forward bearing assembly in place;

a forward seal assembly to receive said nose of said thrust shoulder;

a duct cover which attaches to said front of said center hub and over said thrust shoulder, said duct cover having a front and a rear, said rear of said duct cover including a cavity milled to receive said forward seal assembly and said thrust shoulder; and said rear seal assembly sealing of the nose of the drive shaft and said forward seal assembly sealing off said nose of said thrust shoulder to provide an equal initial pressure on a centerline of said rotor duct assembly and the drive shaft which is maintained during use under water.

26. The rotor duct assembly of claim 25, wherein said rear seal assembly includes a flange lip seal and a rear seal retainer; wherein said flange lip seal includes a cylindrical shaped main body, a center opening in said main body of said flange lip seal, flange about one end of said main body of said flange lip seal, a groove in an end opposite said end with said flange and a spring in said groove; wherein said center opening of said main body of said flange lip seal is for receiving the drive shaft; wherein said rear seal retainer includes a cylindrical shaped main body, a center opening in said main body of said rear seal retainer, flange at about one end of said main body of said rear seal retainer, a groove about said main body of said rear seal retainer and an o-ring in said groove of said rear seal retainer; wherein said center opening of said main body of said seal retainer is for receiving the drive shaft and main body of said flange lip seal; wherein said o-ring provides a seal between said cavity of said rotor and said rear seal retainer for preventing water from getting behind said rear seal assembly; wherein an end opposite said flange of said rear seal retainer is inserted against said flange of said flange lip seal to retain said flange lip seal in place and said flange of said rear seal retainer is fastened inside said cavity of said rotor; and wherein said spring is for applying said rear flange lip seal against the drive shaft and against an inside surface of said main body of said rear seal retainer along said center opening of said rear seal retainer.

27. The rotor duct assembly of claim 25, wherein said forward seal assembly is a flange lip seal and a forward seal retainer; wherein said flange lip seal includes a cylindrical shaped main body, a center opening in said main body of said flange lip seal, flange about one end of said main body of said flange lip seal, a groove in an end opposite said end with said flange and a spring in said groove; wherein said center opening of said main body of said flange lip seal is for receiving said nose of said thrust shoulder; wherein said forward seal retainer includes a cylindrical shaped main body, a center opening in said main body of said forward seal retainer, flange at about one end of said main body of said forward seal retainer, a groove about said main body of said forward seal retainer and an o-ring in said groove of said forward seal retainer; wherein said center opening of said main body of said forward seal retainer is for receiving said nose of said thrust shoulder and said main body of said flange lip seal; wherein said o-ring provides a seal between said cavity of said duct cover and said forward seal retainer for preventing water from getting behind said forward seal assembly; wherein an end opposite said flange of said forward seal retainer is inserted against said flange of said flange lip seal to retain said flange lip seal in place and said flange of said forward seal retainer is fastened inside said cavity of said duct cover; and wherein said spring is for applying said forward flange lip seal against said nose of said thrust shoulder and against an inside surface of said main body of said forward seal retainer along said center opening of said forward seal retainer.

28. The rotor duct assembly of claim 25, wherein said forward bearing assembly includes a tilting pad thrust bearing, a journal runner and a forward bearing retainer; wherein said tilting pad thrust bearing includes a thrust bearing with tilting pads; wherein said thrust bearing is a ring with a center opening to receive said journal runner and with two sides defined by an outside circumference of said ring and said center opening; wherein said tilting pads are mounted on said two sides of said thrust bearing, such that contact is provided against said face of said main body of said rotor by one side of said tilting pads and contact is provided against said rear of said thrust shoulder by the other side of said tiling pads; wherein said tilting pads are movable and each of said tilting pads includes a polymer cap that acts as a bearing surface; wherein said tilting pad thrust bearing is mounted between said stabilizer shaft and an inside surface of said center hub; wherein said journal runner is a ring having a center opening to receive said stabilizer shaft and acts as a wear surface between said stabilizer shaft and said tilting pad thrust bearing and wherein said forward bearing retainer fastens to said rear of said center hub for retaining said forward bearing assembly in place.

29. The rotor duct assembly of claim 28, further including at least one key; wherein said stabilizer shaft includes at least one key way; wherein said journal runner includes at least one key way; and wherein said at least one key is positioned in said stabilizer shaft at least one key way and said journal runner at least one key way, so as to lock said stabilizer shaft and said journal runner together.

30. The rotor duct assembly of claim 27, wherein said thrust shoulder includes a groove in said milled rear of said thrust shoulder to receive an o-ring to prevent water from reaching said nose of said stabilizer shaft.

31. The rotor duct assembly of claim 25, further including a rear thrust runner mounted to said face of said main body of said rotor between said face and said tilting pads; further including a front thrust runner mounted to said rear of said thrust shoulder between said thrust shoulder and said tilting pads; wherein said rear and front thrust runners are disc shaped and include a center opening; and wherein said rear and front thrust runners act as wear surfaces.

32. The rotor duct assembly of claim 25, wherein there are at least two stators between said center hub and said outside rim of said inlet duct for supporting said center hub inside said outside rim.

33. The rotor duct assembly of claim 25, wherein each of said at least two blades includes skew; wherein skew is the repositioning of individual radial blade sections on an axis other than a straight radial axis from a rotational center point of said rotor.

34. The rotor duct assembly of claim 25, further including a duct liner between the water craft and said inlet duct to prevent water from entering said water craft.

35. The rotor duct assembly of claim 34, wherein said rotor duct assembly is in a tunnel of the water craft.

36. The rotor duct assembly of claim 25, wherein said rear seal assembly includes a flange lip seal and a rear seal retainer; wherein said flange lip seal includes a cylindrical shaped main body, a center opening in said main body of said flange lip seal, flange about one end of said main body of said flange lip seal, a groove in an end opposite said end with said flange and a spring in said groove; wherein said center opening of said main body of said flange lip seal is for receiving the drive shaft; wherein said rear seal retainer includes a cylindrical shaped main body, a center opening in said main body of said rear seal retainer, flange at about one end of said main body of said rear seal retainer, a groove about said main body of said rear seal retainer and an o-ring in said groove of said rear seal retainer; wherein said center opening of said main body of said seal retainer is for receiving the drive shaft and main body of said flange lip seal; wherein said o-ring provides a seal between said cavity of said rotor and said rear seal retainer for preventing water from getting behind said rear seal assembly; wherein an end opposite said flange of said rear seal retainer is inserted against said flange of said flange lip seal to retain said flange lip seal in place and said flange of said rear seal retainer is fastened inside said cavity of said rotor; wherein said spring is for applying said rear flange lip seal against the drive shaft and against an inside surface of said main body of said rear seal retainer along said center opening of said rear seal retainer; wherein said forward seal assembly is a flange lip seal and a forward seal retainer; wherein said flange lip seal includes a cylindrical shaped main body, a center opening in said main body of said flange lip seal, flange about one end of said main body of said flange lip seal, a groove in an end opposite said end with said flange and a spring in said groove; wherein said center opening of said main body of said flange lip seal is for receiving said nose of said thrust shoulder; wherein said forward seal retainer includes a cylindrical shaped main body, a center opening in said main body of said forward seal retainer, flange at about one end of said main body of said forward seal retainer, a groove about said main body of said forward seal retainer and an o-ring in said groove of said forward seal retainer; wherein said center opening of said main body of said forward seal retainer is for receiving said nose of said thrust shoulder and said main body of said flange lip seal; wherein said o-ring provides a seal between said cavity of said duct cover and said forward seal retainer for preventing water from getting behind said forward seal assembly; wherein an end opposite said flange of said forward seal retainer is inserted against said flange of said flange lip seal to retain said flange lip seal in place and said flange of said forward seal retainer is fastened inside said cavity of said duct cover; wherein said spring is for applying said forward flange lip seal against said nose of said thrust shoulder and against an inside surface of said main body of said forward seal retainer along said center opening of said forward seal retainer; wherein said forward bearing assembly includes a tilting pad thrust bearing, a journal runner and a forward bearing retainer; wherein said tilting pad thrust bearing includes a thrust bearing with tilting pads; wherein said thrust bearing is a ring with a center opening to receive said journal runner and with two sides defined by an outside circumference of said ring and said center opening; wherein said tilting pads are mounted on said two sides of said thrust bearing, such that contact is provided against said face of said main body of said rotor by one side of said tilting pads and contact is provided against said rear of said thrust shoulder by the other side of said tiling pads; wherein said tilting pads are movable and each of said tilting pads includes a polymer cap that acts as a bearing surface; wherein said tilting pad thrust bearing is mounted between said stabilizer shaft and an inside surface of said center hub; wherein said journal runner is a ring having a center opening to receive said stabilizer shaft and acts as a wear surface between said stabilizer shaft and said tilting pad thrust bearing; wherein said forward bearing retainer fastens to said rear of said center hub for retaining said forward bearing assembly in place; and wherein said thrust shoulder includes a groove in said milled rear of said thrust shoulder to receive an o-ring to prevent water from reaching said nose of said stabilizer shaft.

37. The rotor duct assembly of claim 36, further including a rear thrust runner mounted to said face of said main body of said rotor between said face and said tilting pads; further including a front thrust runner mounted to said rear of said thrust shoulder between said thrust shoulder and said tilting pads; wherein said rear and front thrust runners are disc shaped and include a center opening; and wherein said rear and front thrust runners act as wear surfaces.

38. The rotor duct assembly of claim 36, wherein there are at least two stators between said center hub and said outside rim of said inlet duct for supporting said center hub inside said outside rim.

39. The rotor duct assembly of claim 36, wherein each of said at least two blades includes skew; wherein skew is the repositioning of individual radial blade sections on an axis other than a straight radial axis from a rotational center point of said rotor.

40. The rotor duct assembly of claim 36, further including a duct liner between the water craft and said inlet duct to prevent water from entering said water craft.

41. The rotor duct assembly of claim 36, further including at least one key; wherein said stabilizer shaft includes at least one key way; wherein said journal runner includes at least one key way; and wherein said at least one key is positioned in said stabilizer shaft at least one key way and said journal runner at least one key way, so as to lock said stabilizer shaft and said journal runner together.

* * * * *

UNITED STATES PATENT AND TRADEMARK OFFICE
CERTIFICATE OF CORRECTION

| | |
|---|---|
| PATENT NO. | : 6,482,054 B2 |
| APPLICATION NO. | : 09/871185 |
| DATED | : November 19, 2002 |
| INVENTOR(S) | : Allen L. Treaster et al. |

It is certified that error appears in the above-identified patent and that said Letters Patent is hereby corrected as shown below:

Column 1, Line 7, please insert the following:

--This invention was made with support from the Government under Contract No. N00039-92-C00100. The Government has certain rights in the invention.--

Signed and Sealed this

Nineteenth Day of February, 2008

JON W. DUDAS
*Director of the United States Patent and Trademark Office*